ized Utility Patent

United States Patent

[11] 3,616,141

| [72] | Inventor | Donald C. Anderson<br>Lafayette, Calif. |
|---|---|---|
| [21] | Appl. No. | 884,862 |
| [22] | Filed | Dec. 15, 1969 |
| [45] | Patented | Oct. 26, 1971 |
| [73] | Assignee | Hexcel Corporation<br>Dublin, Calif. |

[54] FORMABLE HONEYCOMB CORE AND METHOD OF MAKING THE SAME
10 Claims, 5 Drawing Figs.

[52] U.S. Cl. .................................................. 161/68,
156/197
[51] Int. Cl. ..................................................... B31d 3/02,
B32b 3/12
[50] Field of Search ........................................... 161/68, 69;
52/615; 29/455 LM; 156/197

[56] References Cited
UNITED STATES PATENTS

| 2,668,327 | 2/1954 | Steele .......................... | 161/68 X |
| 2,734,843 | 2/1956 | Steele .......................... | 161/68 X |
| 3,227,600 | 1/1966 | Holland ........................ | 161/68 |
| 3,342,666 | 9/1967 | Hull .............................. | 161/135 |

FOREIGN PATENTS

| 525,128 | 5/1956 | Canada ........................ | 161/68 |

*Primary Examiner*—John T. Goolkasian
*Assistant Examiner*—Henry F. Epstein
*Attorney*—Townsend and Townsend

ABSTRACT: A pack of honeycomb core material which is expandable to a nonplaner contour, the pack including a plurality of ribbons having undulating corrugations providing alternate zenith and nadir points, selected areas intermediate the zenith and nadir points being bonded to each other whereby the pack may be expanded to form a plurality of multiangular hollow cells.

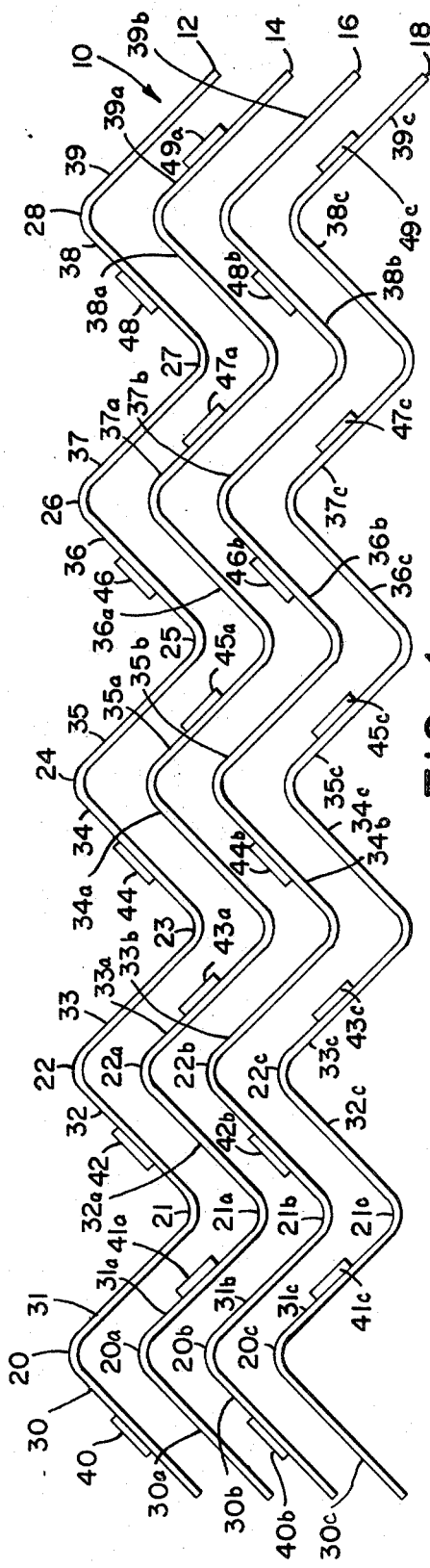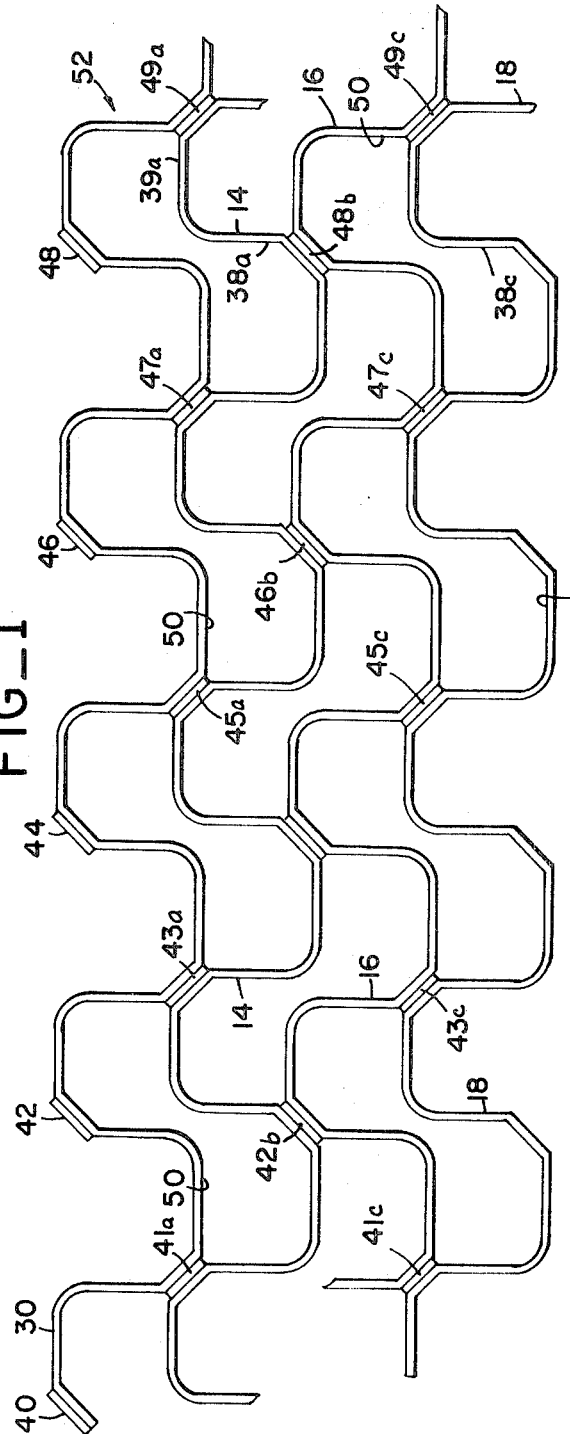

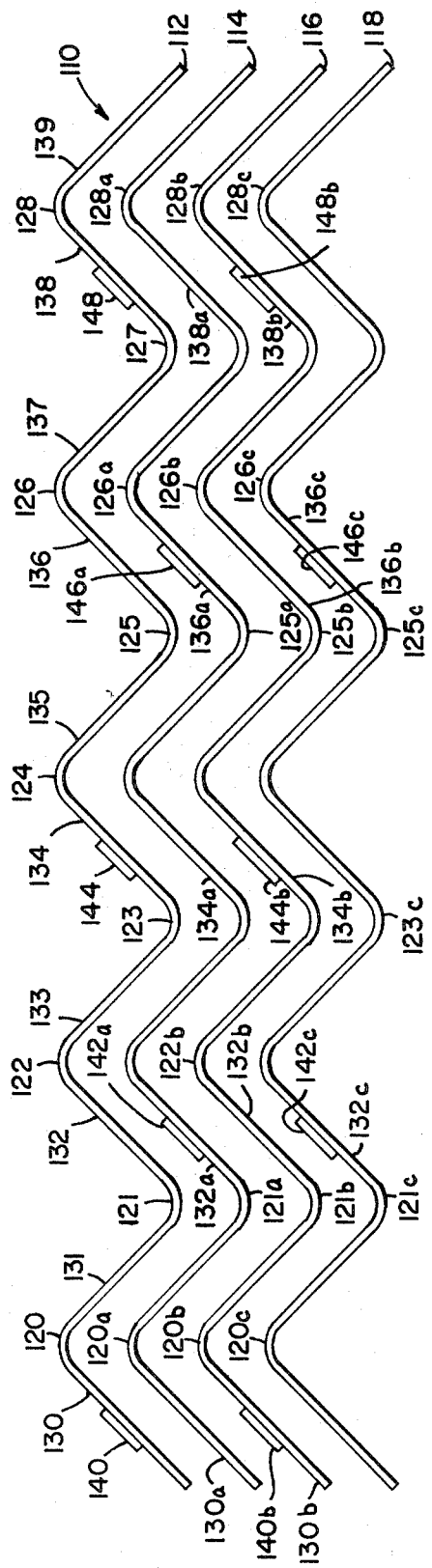

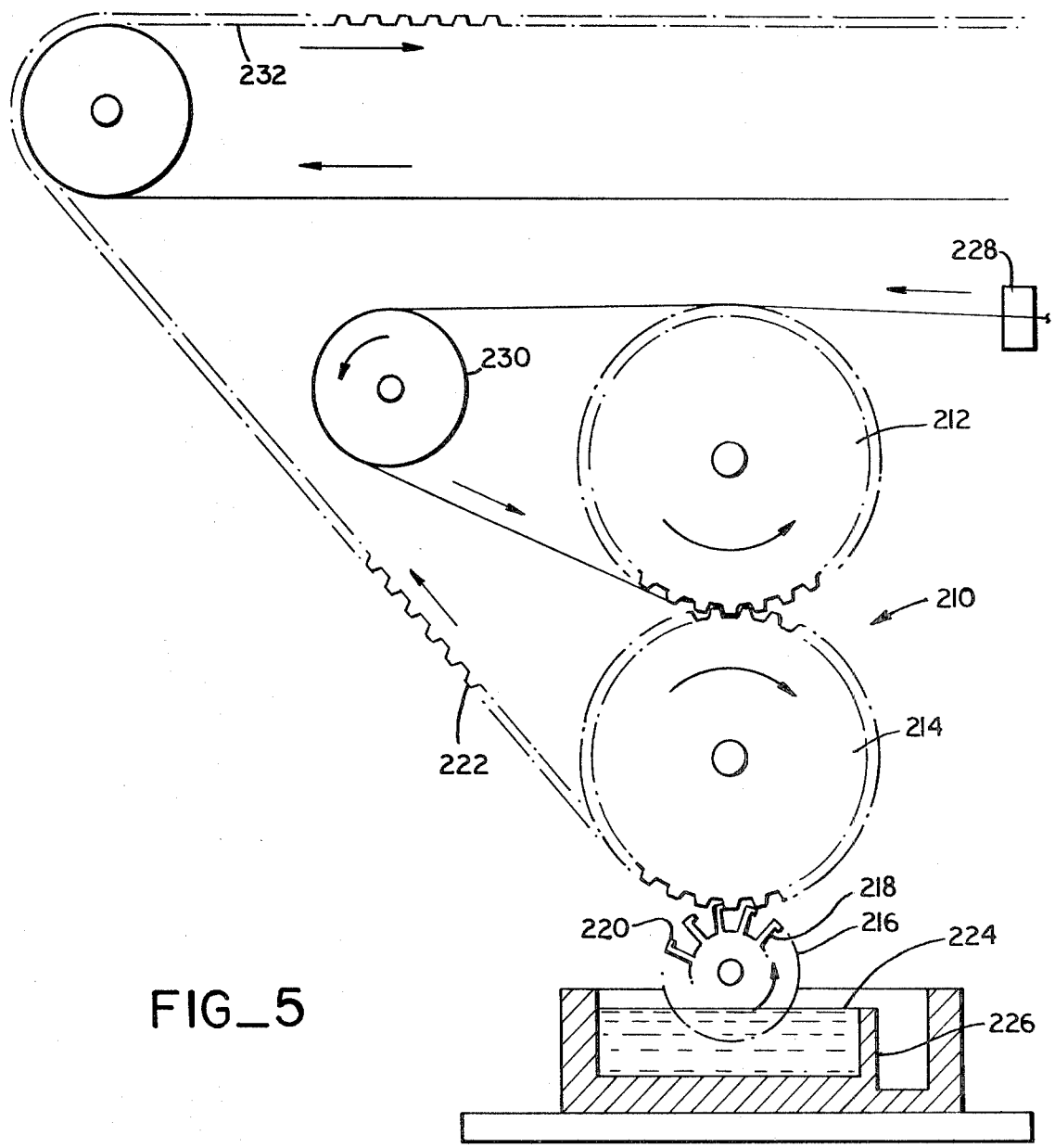
FIG_5

FORMABLE HONEYCOMB CORE AND METHOD OF MAKING THE SAME

BRIEF SUMMARY OF THE INVENTION

This invention relates to honeycomb-type cellular structures and, more particularly, to an improved honeycomb core structure which may be readily formed into simple and compound curves, and an improved method of making the same.

Conventional honeycomb in its expanded multicellular form is comprised of a plurality of corrugated or sinusoidally curved ribbons of flat sheet material which may be made of paper, metal, resin impregnated fabrics, plastic or the like and which ribbons are bonded together at their contacting or abutting nodes. Conventional honeycomb is normally fabricated in the form of flat panel sections and such material is characterized by the fact that when an effort is made to deform it, as by bending, to form a simple curve along one major axis an anticlastic effect develops in that a saddle-back or reverse curve will tend to form along the other major and perpendicular axis of the material. The anticlastic properties of conventional honeycomb are well known in the art and are discussed in prior U.S. Pat. No. 2,668,327.

In applications where it is desired to form honeycomb structures into bodies having simple or compound curves it is desirable to provide honeycomb that can be readily formed into such shapes while at the same time providing a material that will not display substantial anticlastic properties characteristic of conventional hexagonal honeycomb; that will not crush or otherwise fail under the stresses encountered with the forming of the material into curved bodies, which is also a characteristic of conventional hexagonal honeycomb; that provides good physical properties to enable the use of the material in honeycomb sandwich structures where high strength-to-weight ratios are characteristically obtainable; and that does not use an excess amount of material to provide for formability.

Heretofore efforts have been made to provide a honeycomb structure which is readily formable into simple and compound curvatures. One example of such efforts is disclosed in prior U.S. Pat. No. 3,227,600 assigned to the assignee of the present invention, and the present invention constitutes an improvement thereof.

An object of the present invention is to overcome disadvantages in prior structures of the indicated character and to provide an improved honeycomb core structure which is readily formable into simple and compound curves and which provides improved physical characteristics including improved shear strength and isotropic properties whereby sandwich structures incorporating honeycomb cores embodying the present invention can be designed to utilize the excellent strength-to-weight ratios that are characteristic of conventional honeycomb sandwich construction.

Another object of the invention is to provide an improved honeycomb core structure which may, if desired, be made in the form of expandable packs or which may be initially fabricated in the form of fully expanded open cell honeycomb core structures.

Another object of the invention is to provide an improved honeycomb core structure having relatively small cells which may be manufactured with relatively large tooling.

Another object of the invention is to provide an improved honeycomb core structure the configuration of which affords improved bonding between the ribbons thereof.

Still another object of the invention is to provide an improved multicellular honeycomb structure which is simple in construction, economical to manufacture, durable, efficient and reliable in service.

The above as well as other objects and advantages of the present invention will become apparent from the following description, the appended claims and the accompanying drawings.

BRIEF DESCRIPTION OF THE DRAWINGS

FIG. 1 is an enlarged fragmentary, exploded view of one embodiment of the invention, showing the same in the form of an unexpanded pack;

FIG. 2 illustrates the pack of FIG. 1 as expanded;

FIG. 3 is an enlarged, fragmentary, exploded view of another embodiment of the invention, showing the same in the form of an unexpanded pack;

FIG. 4 illustrates the pack of FIG. 3 as expanded; and

FIG. 5 is a schematic view of apparatus which may be utilized to corrugate and apply adhesive to the ribbons of the embodiments of the invention illustrated.

DETAILED DESCRIPTION OF THE PREFERRED EMBODIMENTS

Referring to the drawings, one embodiment of the invention is illustrated in FIGS. 1 and 2 thereof, FIG. 1 illustrating a pack, generally designated 10, of honeycomb in the unexpanded condition and with ribbons 12, 14, 16 and 18 being shown as separated for the purposes of clarity of illustration. It will be understood that prior to expansion the ribbons 12, 14, 16 and 18 will be bonded together in the manner hereinafter described in greater detail.

All of the ribbons 12, 14, 16 and 18, which may be made of paper, metal, resin impregnated fabrics, plastic or the like, are identically precorrugated with the same zig zag wavelines so that the alternate zenith and nadir points can be nested together. Selected areas intermediate the zenith and nadir points of adjacent ribbons are bonded to one another as will be more fully described hereinafter so as to allow controlled separation of the adjacent ribbons. As the pack is expanded after bonding of the ribbons a uniform unfolding of the ribbons occurs to define an orderly array of hollow multiangular cells. Assuming that the ribbons are all initially of substantially the same length, the resultant honeycomb cellular core will be substantially rectangular in plan view.

Referring to FIG. 1, after the corrugating operation each ribbon has a series of V-shaped corrugations along its entire length. The ribbon 12, for example, defines a series of alternate zenith and nadir points numbered consecutively 20 through 28. These zenith and nadir points are joined by alternately oppositely angularly inclined flat ribbon portions or segments numbered consecutively 30 through 39 inclusive. Each additional ribbon 14, 16 and 18 in the pack is corrugated identically to the ribbon 12 and each defines alternate zenith and nadir points which are joined by flat ribbon sections as previously described. Corresponding parts of all the ribbons 14, 16 and 18 are therefore numbered similarly to the ribbon 12 but are suffixed by the letters a, b, and c, respectively, to distinguish them in the drawing.

As shown in FIG. 1, in this embodiment of the invention each ribbon is bonded to an adjacent ribbon intermediate the zenith and nadir points with alternate ribbons being bonded on oppositely angularly disposed segments of the portions of the ribbons between the zenith and nadir points. In other words, such segments of alternate ribbons are bonded to the adjacent ribbon on the opposite sides of the mating zenith and nadir points of the adjacent ribbons. Thus, for example as shown in FIG. 1, the segments 31a, 33a, 35a, 37a and 39a of the ribbon 14 are bonded at the bonding areas 41a, 43a, 45a, 47a and 49a to the segments 31, 33, 35, 37 and 39 respectively of the ribbon 12, the bonding areas preferably being midway between the zenith and nadir points. Similarly, the segments 31c, 33c, 35c, 37c and 39c of the ribbon 18 are bonded at the bonding areas 41c, 43c, 45c, 47c and 49c to the segments 31b, 33b, 35b, 37b and 39b, respectively, of the ribbon 16 while the segments 30b, 32b, 34b, 36b and 38b of the alternate ribbon 16 are bonded at bonding areas 40b, 42b, 44b, 46b and 48b to the segments 30a, 32a, 34a, 36a and 38a, respectively, of the ribbon 14 whereby each ribbon is thus bonded to an adjacent ribbon intermediate the zenith and nadir points with alternate ribbons being bonded on oppositely angularly disposed segments of the portions of the ribbons between the zenith and nadir points. Such pattern of alternate bonding areas is continued throughout the entire pack of material.

A honeycomb pack 10 comprising a plurality of corrugated ribbons bonded to one another in the pattern above described can be expanded to form an open cellular structure of the character indicated in FIG. 2 of the drawings, expansion of the pack 10 being accomplished by pulling apart the end webs of the pack in a manner well known in the art. As the pack is expanded the ribbons 12, 14, 16 and 18 separate along the adjacent areas which are not bonded to each other and an unfolding of the ribbons occurs to create an array of similarly shaped cell openings, each cell 50 of which in the embodiment of the invention illustrated in FIGS. 1 and 2 is defined by eight major wall areas. Thus, for example, as shown in FIG. 2 each cell in the top row 52 of the expanded core is defined by generally flat segments of the ribbon 12 and by flat segments of the adjacent ribbon 14. It is to be noted that at the bonding areas where each ribbon is bonded to the adjacent ribbon, full pressure may be applied to the ribbons during the bonding operation to increase the effectiveness of the bond because of the wedging action of the mating ribbons.

The multiangular shape of the cells in conjunction with the strong bonds between the ribbons provides excellent structural rigidity and high shear strength for the expanded core. In the fully expanded form as shown in FIG. 2 the major wall areas of each cell between the bonding areas define pairs of adjacent wall sections which are disposed at angles generally normal to each other with a smoothly blending radius therebetween, the particular angularity between adjacent major wall areas depending upon the degree of expansion of the pack. It will be noted that in this embodiment of the invention, alternate rows of bonding areas are disposed at an angle of substantially 90° with respect to each other so that no shear plane passes only through bonding material without intersecting wall material, thereby providing excellent isotropic properties.

When the pack is expanded in a flat plane, all of the individual cell axes will extend in a common or parallel direction and all of the ribbons and bonding areas remain substantially parallel with respect to each other. The cellular material is, however, readily formable into curved shapes to define simple or compound curve bodies without exhibiting anticlastic properties as commonly observed in conventional honeycomb. Bending or flexing of the material will subject the individual ribbons to complex stresses and forces which will result in reorienting the cell axes out of parallel alignment with each other and which will further result in the bonding areas assuming a skewed relationship with respect to each other. For example, the cell wall areas between the relatively rigid bonding areas are subjected to complex torsional forces and accordingly will flex and bend in a complex pattern so that the material can conform itself to the curved contour of the shape into which it is being formed. The unique cell configuration of this embodiment of the invention provides sufficient flexibility for the ribbons to flex, bend and deform to assume relatively sharp radii of curvature without crumpling or without physically failing either the bonding areas or the ribbon material itself.

Another embodiment of the invention is illustrated in FIGS. 3 and 4, FIG. 3 illustrating a pack 110 of honeycomb in the unexpanded condition and with the ribbons 112, 114, 116 and 118 being illustrated as separated for the purposes of clarity. It will be understood that prior to expansion the ribbons 112, 114, 116 and 118 will be bonded together in the manner hereinafter described in greater detail.

All of the ribbons 112, 114, 116 and 118 are identically precorrugated with the same zigzag waveline as described in connection with the embodiment of the invention illustrated in FIGS. 1 and 2 so that the alternate zenith and nadir points can be nested together. Selected areas intermediate the zenith and nadir points of adjacent ribbons are bonded to one another as will be more fully described hereinafter so as to allow for controlled separation of adjacent ribbons. As the pack is expanded after bonding of the ribbons, a uniform unfolding of the ribbons also occurs in this embodiment of the invention to define an orderly array of hollow multiangular cells and provided that the ribbons are initially all of the same length the resultant honeycomb cellular core will be substantially rectangular in plan view.

Referring to FIG. 3 of the drawings, after the corrugated operation each ribbon has a series of V-shaped corrugations along its entire length, the ribbon 112 for example defining a series of alternate zenith and nadir points numbered consecutively 120 through 128. These zenith and nadir points are joined by alternate oppositely angularly disposed flat ribbon portions or segments numbered consecutively 130 through 139, inclusive. Each additional ribbon 112, 114, 116 and 118 in the pack is corrugated indentically to the ribbon 112 and each defines alternate zenith and nadir points which are joined by flat ribbon sections. Corresponding parts of all of the ribbons 114, 116 and 118 are therefore numbered similarly to the ribbon 112 but are suffixed by the letters $a$, $b$ and $c$, respectively, to distinguish them in the drawings.

As shown in FIG. 3, in this embodiment of the invention each ribbon is bonded to an adjacent ribbon intermediate alternate zenith and nadir points with alternate ribbons being staggered and bonded so that corresponding and staggered angularly disposed segments of the portions of the alternate ribbons between the zenith and nadir points are bonded together. In other words, when the bonding material is applied to each ribbon every other zenith point is skipped and the skipped zenith points are staggered on alternate ribbons. Thus, for example, as shown in FIG. 3, the segments 132$a$ and 136$a$ of the ribbon 114 are bonded at the bonding areas 142$a$ and 146$a$ to the segments 132 and 136, respectively, of the ribbon 112. Similarly the segments 130$b$, 134$b$ and 138$b$ of the ribbon 116 are bonded at the bonding areas 140$b$, 144$b$ and 148$b$ to the segments 130$a$, 134$a$ and 138$a$ of the ribbon 114 while the segments 132$c$ and 136$c$ of the alternate ribbon 118 are bonded at the bonding areas 142$c$ and 146$c$ to the segments 132$b$ and 136$b$ of the ribbon 116 whereby each ribbon is thus bonded to an adjacent ribbon intermediate the zenith and nadir points with the bonding areas of alternate ribbons being staggered on corresponding angularly disposed segments of the portions of the ribbons between the zenith and nadir points. The ribbons are preferably bonded midway between the zenith and nadir points and such a pattern of alternate bonding areas is continued throughout the entire pack of material.

A honeycomb pack 110 comprising a plurality of corrugated ribbons bonded to one another in the pattern above described can be expanded to form an open cellular structure of the character indicated in FIG. 4 of the drawings. Expansion of the pack 110 can be accomplished by pulling apart the end webs of the pack and as the pack is expanded the ribbons separate along the adjacent areas which are not bonded to each other and an unfolding of the ribbons occurs to create an array of similarly shaped cell openings, each cell 150 of which in the embodiment of the invention illustrated in FIG. 4 is defined by 12 major wall areas. Thus, for example, as shown in FIG. 4, each cell 150, in the top row 152 is defined by segments of the ribbon 112 and by segments of the adjacent ribbon 114. It is to be noted that in this embodiment of the invention that at the bonding areas where the ribbon 114 is bonded to the ribbon 112 substantial pressure may also be applied to the ribbons during the bonding operation to increase the effectiveness of the bond because of the wedging action of the mating ribbons.

The multiangular shape of the cells 150 in conjunction with the strong bonds between the ribbons provides excellent structural rigidity and in the fully expanded form as shown in FIG. 4 the major wall areas of each cell between the bonding areas define adjacent pairs of wall sections which are disposed at angles generally normal to each other with a smoothly blending radius therebetween, the particular angularity between adjacent major wall areas depending upon the degree of expansion of the pack 110.

When the pack is expanded in a flat plane all of the individual cell areas of this embodiment of the invention will also extend in a common or parallel direction and all of the ribbons and bonding areas remain substantially parallel to one another. In this embodiment of the invention the cellular material is also readily deformable into curved shapes to define simple or compound curved bodies without exhibiting anticlastic properties. Bending or flexing of the material will subject the individual ribbons 112, 114, 116 and 118 to complex stresses and forces which will result in reorienting the cell axes out of parallel alignment with each other and will further result in the bonding areas assuming a skewed relationship with respect to each other. For example, the cell wall areas between the relatively rigid bonding areas are subjected to complex torsional forces and accordingly will flex and bend in a complex pattern whereby the material can conform itself to the curved contour of the shape into which it is being formed. The unique cell configuration of this embodiment of the invention also provides sufficient flexibility for the ribbons to flex, bend and deform to assume relatively sharp radii of curvature without crumpling or without physically failing either the bonding areas or the ribbon material itself.

In FIG. 5 there is illustrated schematically apparatus, generally designated 210, which may be utilized to corrugate and apply adhesive to the ribbons of each of the embodiments of the present invention described heretofore. The apparatus 210 is comprised of a pair of corrugating rolls 212 and 214 which function to corrugate the ribbons as illustrated in FIGS. 1 and 3, a rotatable applicator 216 being provided having angularly disposed, spaced teeth 218 thereon, each presenting an application surface 220 adapted to contact the corrugated ribbon stock 222 intermediate (preferably midway between) the zenith and nadir points. Suitable bonding material 224 is received on the teeth 218 from an applicator reservoir 226 and thereafter transferred to the corrugated ribbon stock 222 as the application surfaces 220 engage the ribbon stock intermediate the zenith and nadir points.

In use, the initially flat ribbon stock which is to be corrugated first passes through a conventional lubricator 228 after which the ribbon passes over an idler roll 230 and between the corrugating rolls 212 and 214, the corrugated ribbon stock then engaging the surfaces 220 of the teeth 218 of the applicator 216. The corrugated ribbon stock with the bonding material applied thereto then moves out to a conveyor 232 from which the ribbon stock is subsequently removed and cut to the desired length. In manufacturing the embodiment of the invention illustrated in FIGS. 1 and 2 it is merely necessary to reverse each alternate ribbon end for end when the ribbons are stacked in nested relationship to form the pack 10.

The apparatus 210 may also be utilized in manufacturing the embodiment of the invention illustrated in FIGS. 3 and 4 by making the pitch of the corrugation rolls 212 and 214 one half of the pitch of the rolls utilized in forming the corrugations for the embodiments illustrated in FIGS. 1 and 2. In the alternative an applicator 216 may be provided having teeth thereon the pitch of which is double the pitch of the teeth utilized in applying bonding material to ribbons utilized in constructing the embodiment illustrated in FIGS. 1 and 2.

It should be noted that honeycomb cores made according to the various embodiments of the invention heretofore described can be expanded substantially in accordance with any of a variety of well known and commonly employed methods used to expand more conventional types of honeycomb material. It should also be noted that although the invention has been described with reference to corrugating, bonding and stacking of "ribbons" to form a pack of expandable honeycomb material, the term "ribbons" as used herein in the claims is intended to include relatively large rectangular sections of sheet material which can be corrugated, bonded and stacked in the manner herein described to form a parent block or pack of honeycomb from which thinner slices of honeycomb can be sawed or sliced to desired thickness or "T" dimension. The technique of manufacturing parent blocks or packs of more conventional honeycomb by bonding and stacking together relatively large rectangular sections of sheet material and from which can be sliced or sawed smaller sections of honeycomb of desired thickness is well known and understood in the art of honeycomb manufacture as exemplified for example by prior U.S. Pat. No. 2,734,843 issued Feb. 14, 1956.

Although in the particular embodiments of the invention illustrated in the drawings the individual ribbons are corrugated to define rather sharp pointed zenith and nadir points it is possible to preform the ribbons with more rounded or flattened undulations or sinusoidally contoured corrugations. It is also possible to make alternate corrugations in each web of somewhat different wavelength or shape so long as the mating corrugations of adjacent ribbons in the stack are designed and proportioned to nest with each other and to permit bonding of adjacent ribbons together as above described.

It will be understood that various changes and modifications may be made in the details, shape, arrangement of parts and steps which have been herein described and illustrated without departing from the spirit of the invention.

What is claimed is:

1. A pack of honeycomb material which is expandable to a nonplanar contour comprising, in combination, a plurality of elongated ribbons each having undulating corrugations along its length providing alternate zenith and nadir points, said ribbons being aligned one within the other in stacked relationship, selected areas intermediate the zenith and nadir points of adjacent ribbons being bonded to each other, said bonding areas securing the adjacent ribbons against separation at the bonding areas when the pack is in an expanded condition, said adjacent ribbons being separable along the unbonded surfaces intermediate said bonding areas to form a plurality of multiangular hollow cells.

2. The combination as set forth in claim 1 wherein corresponding segments of alternate ribbons are bonded to the adjacent ribbon on opposite sides of the mating zenith and nadir points of the adjacent ribbon.

3. The combination as set forth in claim 1 wherein each ribbon is bonded to an adjacent ribbon intermediate the zenith and nadir points thereon with alternate ribbons being bonded on oppositely angularly disposed segments of the portions of the ribbons between the zenith and nadir points.

4. The combination as set forth in claim 1 wherein each ribbon is bonded to an adjacent ribbon intermediate alternate zenith and nadir points with alternate ribbons being staggered and bonded whereby corresponding and staggered angularly disposed segments of the portions of the alternate ribbons between the zenith and nadir points are bonded to each other.

5. The combination as set forth in claim 1 wherein each cell is defined by eight major wall areas disposed at angles generally normal to each other.

6. The combination as set forth in claim 1 wherein each cell is defined by twelve major wall areas disposed at angles generally normal to each other.

7. In the art of honeycomb, a material readily formable to a nonplanar contour without exhibiting substantial anticlastic properties comprising, in combination, a stack of corrugated ribbons each defining alternate zenith and nadir points, said ribbons in stacked relationship being aligned one within the other, bonding areas bonding each ribbon to an adjacent ribbon intermediate the zenith and nadir points with alternate ribbons being bonded on different segments of the portions of the ribbons between the zenith and nadir points, and stack of ribbons defining an open cellular honeycomb structure comprising a plurality of multiwall cells each defined by at least eight major wall areas, the major wall areas of each cell between the bonding points defining pairs of adjacent wall sections disposed at angles generally perpendicular to each other.

8. The combination as set forth in claim 7 wherein said bonding areas are disposed midway between the zenith and nadir points.

9. A method of making honeycomb core material which can be controllably contoured to nonplanar surfaces comprising the steps of corrugating a plurality of ribbons with mating undulations having alternate zenith and nadir points, stacking said plurality of ribbons with their corrugations in mating relationship with respect to each other to form a pack, bonding each said ribbon to an adjacent ribbon intermediate the zenith and nadir points with alternate ribbons being bonded on spaced angularly disposed segments of the portions of the ribbons between the zenith and nadir points, and expanding said ribbon pack to form a plurality of multiangular hollow cells.

10. A method of making honeycomb material which can be controllably contoured to nonplanar surfaces comprising the steps of corrugating a plurality of ribbons with a series of evenly spaced alternating zenith and nadir points along their entire length, bonding each of said ribbons to an adjacent ribbon intermediate the zenith and nadir points with the bonding areas of alternate ribbons being staggered on angularly disposed segments of the portions of the ribbons between the zenith and nadir points, and expanding said ribbon pack to form a plurality of multiangular hollow cells.